United States Patent [19]

Takagi et al.

[11] Patent Number: 4,812,966
[45] Date of Patent: Mar. 14, 1989

[54] WORD BLOCK SEARCHER FOR WORD PROCESSING EQUIPMENT AND SEARCHING METHOD THEREFOR

[75] Inventors: Syoji Takagi, Toyoake; Hiroyoshi Saito, Yokohama, both of Japan

[73] Assignee: Kabushiki Kaisha Toshiba, Kawasaki, Japan

[21] Appl. No.: 798,796

[22] Filed: Nov. 15, 1985

[30] Foreign Application Priority Data

Nov. 16, 1984 [JP] Japan .................. 59-242680

[51] Int. Cl.⁴ .................. G06F 5/00; G06F 1/00
[52] U.S. Cl. .................................. 364/200
[58] Field of Search .................. 340/709; 364/200 MS File, 900 MS File, 419

[56] References Cited

U.S. PATENT DOCUMENTS

| | | | |
|---|---|---|---|
| 4,056,821 | 11/1977 | Vittorelli | 364/900 |
| 4,125,868 | 11/1978 | Hruby et al. | 364/900 |
| 4,250,560 | 2/1987 | Dethloff et al. | 364/900 |
| 4,264,217 | 4/1981 | De Sieno | 364/900 |
| 4,314,356 | 2/1982 | Scarbrough | 364/900 |
| 4,355,913 | 10/1982 | Rutkowski, Jr. | 364/900 |
| 4,408,302 | 10/1983 | Fessel et al. | 364/900 |
| 4,417,322 | 11/1983 | Berry et al. | 364/900 |
| 4,433,392 | 2/1984 | Beaven | 364/200 |
| 4,435,777 | 3/1984 | McCaskill et al. | 364/200 |
| 4,495,490 | 1/1985 | Hopper et al. | 340/709 |
| 4,495,566 | 1/1985 | Dickinson et al. | 364/200 |
| 4,577,288 | 3/1986 | Busch | 364/900 |
| 4,625,295 | 11/1986 | Skinner | 364/900 |
| 4,633,430 | 12/1986 | Cooper | 364/900 |
| 4,674,066 | 6/1987 | Kucera | 364/900 |

FOREIGN PATENT DOCUMENTS 0190511 8/1986 Japan .................. 364/419

OTHER PUBLICATIONS

John D. Lee, "Wordstar and CP/M Made Easy", Copyright 1983, Chapter 16, pp. 51-56, Editing-the Find and Replace Commands.
CP/M Operating System Manual, Digital Research, Jul. 1982, pp. 17-23.
Zaks, The CP/M Handbook with MP/M, Sybex, 1980, 109-114, 137-138.

Primary Examiner—Gareth D. Shaw
Assistant Examiner—Viet Q. Nguyen
Attorney, Agent, or Firm—Cushman, Darby & Cushman

[57] ABSTRACT

A word block searching method searches for a specific designated word block (a one-sentence word block). Instead of designating it by a cursor operation from the head position to the tail position of the word block, portions of the head and tail portions are designated. A word block searcher of the invention has a CPU for performing head and tail portion searching of word block data in a document memory based on partial head and tail position designation. The CPU is also for reading out a word block defined by the found head and tail positions and displaying the readout word block.

28 Claims, 6 Drawing Sheets

The ***** word processor [JW-6] is a software-based,
     HW1       SP1
microcomputer controlled word processing system with an
amazing capacity which can be used to simplify and [JW-6] is
                                                HW2
rationalize Japanese text preparation procedures. ST be used for
chiefly designed for Japanese language, but it can
word-processing [English language]. TW1
                 EN The ***** word processor EW-100 is a software-
based, microcomputer controlled word processing system with an
amazing capacity which can be used to simplify and
rationalize English text preparation procedures. EW-100 is
chiefly designed for [English language], but it can be used for
                                         TW2
word-processing French or German language.

The present invention may be applied to the *****
word processor [JW-6] or EW-100.
               HW3

WORD BLOCK SEARCHER FOR WORD PROCESSING EQUIPMENT AND SEARCHING METHOD THEREFOR

BACKGROUND OF THE INVENTION

The present invention relates to a word block searcher for word processing equipment and searching method therefor for searching a word block in a key input sentence data or the like and for displaying each found word block.

Wordprocessors normally have various functions such as: copy, move, replace (correct) and delete specific word blocks. When any of these functions is used, the cursor is moved to the head position of a desired word block by scrolling or the like, and the selected function key is depressed to designate the head position of the desired word block. Then, the cursor is moved to the tail position of the desired word block by scrolling or the like, and the selected function key is depressed again to designate the tail position of the word block. This scroll or cursor operation is very inconvenient to the operator when the word block is long or bulky.

SUMMARY OF THE INVENTION

It is accordingly an object of the present invention to provide a word block searcher for word processing equipment and searching method therefor in which the operation required for searching for a prescribed word block is simplified.

To achieve the above object, a word block searching method of the present invention performs the following. When a specific word block (e.g., one sentence) is to be designated, the word block is not wholly specified from the head position to the tail position by cursor operation. Instead, portions at the head (or leading) and tail (or trailing) positions of the specific word block are specified so as to designate the specific word block.

Further, a word block searcher of the present invention comprises means for performing head/tail (or leading/trailing) word search within word block data in a document memory in accordance with key input data for the partial word block head/tail designation, and means for reading out a word block designated by the designated head and tail words and for displaying the found word block.

DETAILED DESCRIPTION OF THE PREFERRED EMBODIMENTS

The preferred embodiment of the present invention will now be described below with reference to the accompanying drawings.

Figure 1:
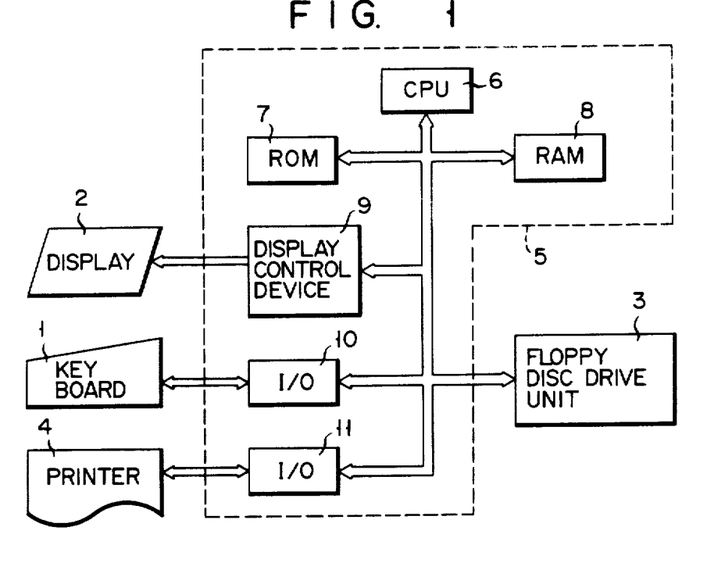
FIG. 1 is a block diagram showing the basic configuration of a word block searcher for word processing equipment according to an embodiment of the present inventon.

FIG. 1 is a block diagram showing the basic configuration of a word block searcher (hardware) for word processing equipment according to an embodiment of the present invention. Referring to FIG. 1, keyboard 1 having keys for inputting various characters and symbols and various function keys is connected to CPU 6 through I/O device 10 in microcomputer 5. Typical function keys of keyboard 1 include the Search Designate/Execute key, Copy key, Move key, Replace (Correct) key, Delete key, Cancel key, and Complete key. (The Complete key is used to complete document preparation so as to store input documents on a floppy disk or the like. Some wordprocessors do not have such a key.)

CPU 6 is connected to ROM 7, RAM 8, display control device 9, and I/O device 11 through a data bus in microcomputer 5, and is also connected to floppy disk drive unit 3. Display control device 9 serves as an interface for coupling display device 2, comprising a liquid crystal panel or a CRT, to CPU 6. I/O device 11 serves as an interface for coupling printer 4 to CPU 6.

Figure 2:
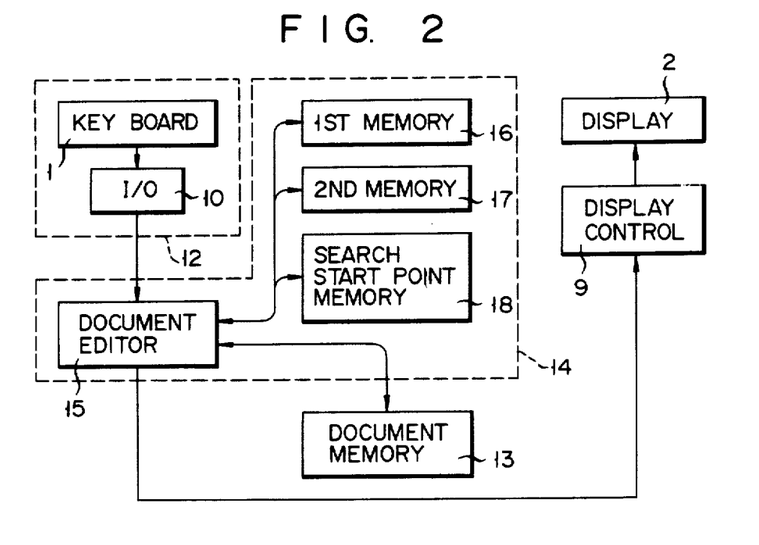
FIG. 2 is a block diagram showing the configuration of the main part of the word block searcher for word processing equipment according to the embodiment of FIG. 1.

FIG. 2 is a block diagram showing the main part of the word block searcher for word processing equipment shown in FIG. 1. Character input section 12 consisting of keyboard 1 and I/O device 10 is connected to document editor 15. Document editor 15 is formed in CPU 6 by a program, and performs various text editing operations including insert, move and delete. Various text editing operations at the software level are known in Japanese Patent Disclosure No. 55-164934, and a detailed description therefor is omitted.

Document editor 15 is connected to document memory 13, first memory 16, second memory 17, and search start point memory 18 allocated in RAM 8 shown in FIG. 1. Document memory 13 is a large-capacity memory for storing sentence (document) data or the like. First memory 16 is a small-capacity memory (may be a register) for storing the string of initial word characters (head word or leading word) of a sentence (word block) to be searched. Second memory 17 is a small-capacity memory for storing the string of last word characters (tail word or trailing word) of the sentence (word block) to be searched. Search start point memory 18 is a small-capacity memory for storing a memory address for starting the search (the initial search start position is the cursor position on the display monitor). Components 15 to 18 constitute search control section 14. Document data edited at document editor 15 is supplied to display device 2 through display control device 9 and is displayed, as needed.

The word block searcher for word processing equipment shown in FIGS. 1 and 2 operates in the following manner.

Figure 3:
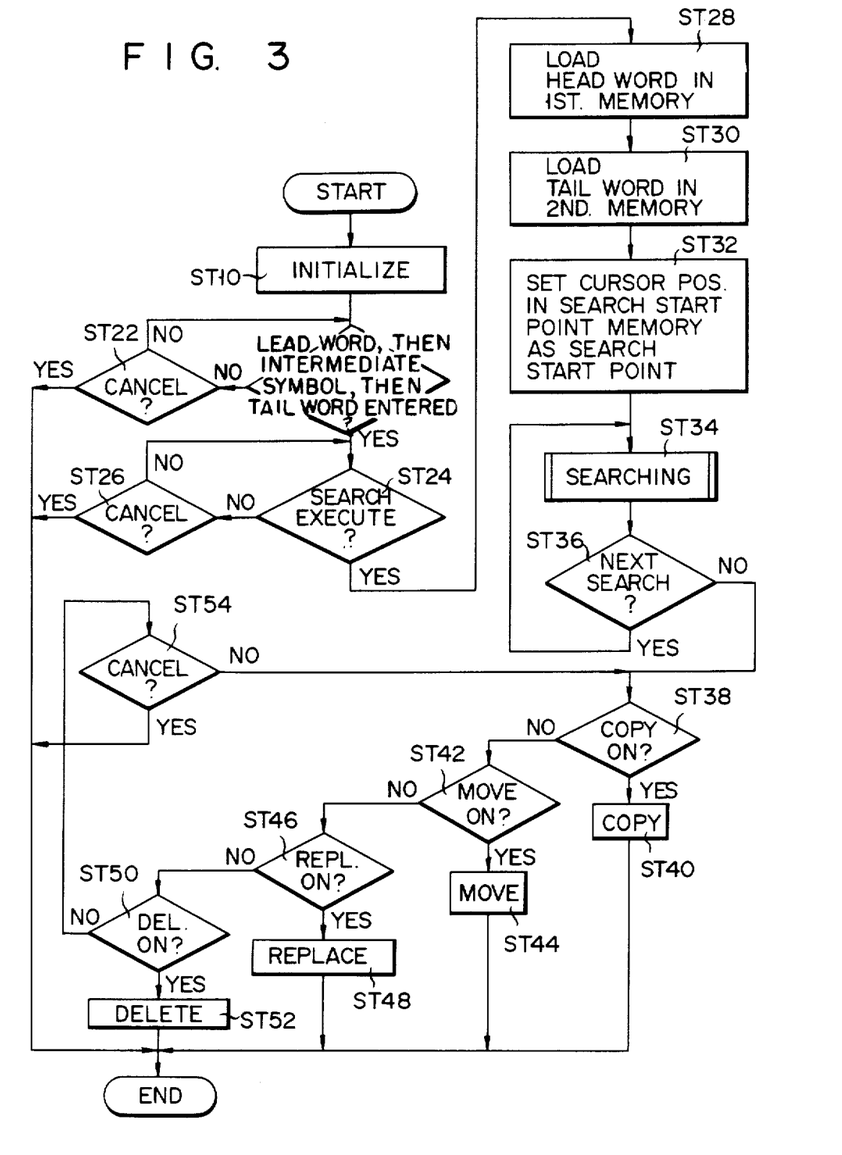
FIG. 3 is a flow chart showing the basic sequence of the searching method according to an embodiment of the present invention.

FIG. 3 is a flow chart of the basic sequence of the searching method used in the searcher shown in FIGS. 1 and 2.

Figure 5:
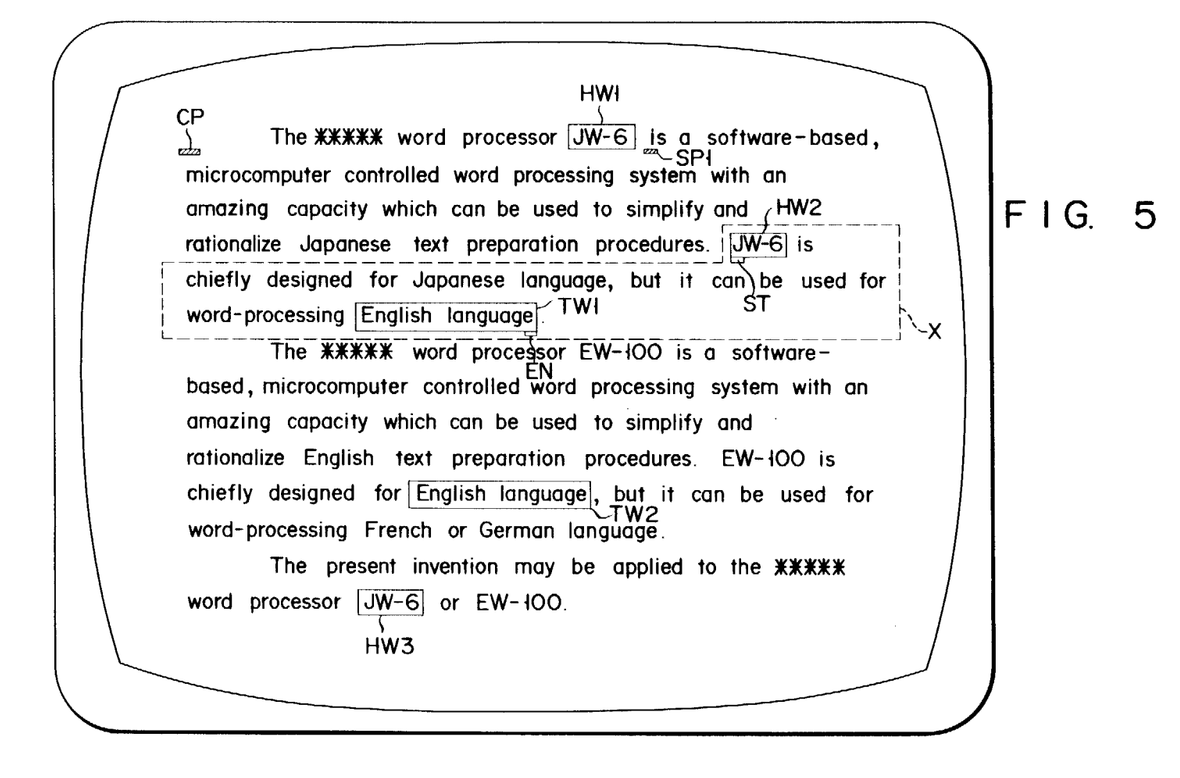
FIG. 5 shows an example of a display sentence for explaining the operation in accordance with the searching method according to the present invention.

Assume that a document as shown in FIG. 5 is stored in document memory 13 and the sentence surrounded by the dotted line (word block X) is the object of searching.

The operator of the wordprocessor first depresses the Search Designate/Execute key of keyboard 1 (start of the flow shown in FIG. 3). Then, hardware including CPU 6 is initialized (ST10), and key input of the word for searching the word block X is requested (instruction indicating this request is displayed on the monitor of the wordprocessor). When no key input is performed (NO in ST20) and the Cancel key is depressed (YES in ST22), the search function is cancelled (end of the flow shown in FIG. 3). When the Cancel key is not depressed (NO in ST22), execution of the sequence of the search program is interrupted until the word for searching is keyed in by the operator.

After completing key input of the head word (leading v, which in this example is "JW-6", a key input of a given intermediate symbol separating the head word from the tail word of word block X is made. This intermediate symbol indicates the end of the head word and separates it from the tail word. After the key input of tail word (trailing word) "English language" of word block X (YES in ST20), a judgement as to whether or not the search is to be made is requested. When the Search Designate/Execute key is not depressed (NO in ST24) and the Cancel key is depressed (YES in ST26), the search function is cancelled (end). When the Cancel key is not depressed (NO in ST26), execution of the sequence of the search program is interrupted until the Search Designate/Execute key is depressed by the operator.

When the Search Designate/Execute key is depressed again (YES in ST24), the input head word "JW-6" is loaded in first memory 16 (ST28) and input tail word "English language" is loaded in second memory 17 (ST30). Subsequently, data indicative of the current cursor position (e.g., CP in FIG. 5) is stored as the search starting point in search start point memory 18 (ST32).

When storage of the head word "JW-6", the tail word "English language" and the cursor position CP is completed, searching for word block X defined between head word "JW-6" and tail word "English language" is started from position CP (ST34). (Details of the word block search will be described later with reference to FIG. 4).

When a word block defined between "JW-6" and "English language" is found, it is displayed on the screen. When the displayed word block is not the one desired, a Next Search key (or Search Designate/Execute key) of keyboard 1 is depressed (YES in ST36). The Next Search key is repeatedly depressed until the object word block X is found and displayed on the screen.

When a match to word block X (sentence inside the dotted line in FIG. 5) is displayed on the screen, any desired operation such as copy can be performed. When the Copy key is depressed (YES in ST38), a copy of the displayed word block is performed (ST40), and the sequence of FIG. 3 is completed (end). When the Copy key is not depressed but the Move key is depressed (NO in ST38, YES in ST42), the displayed word block is moved to a prescribed location (ST44), and the sequence of FIG. 3 ends. When the Replace (Correct) key is depressed instead of the Move key (NO in ST42, YES in ST46), the displayed word block is replaced (corrected) with given words (ST48), and the sequence of FIG. 3 ends. When the Delete key is depressed instead of the Replace (Correct) key (NO in ST46, YES in ST50), the displayed word block is deleted (ST52), and the sequence of FIG. 3 ends. When none of the Copy, Move, Replace (Correct) and Delete keys are depressed and the Cancel key is not depressed either (NO in ST54), execution of the program sequence is interrupted until one of the Copy, Move, Replace (Correct) and Delete keys is depressed by the operator If no further operation is required after the word block is found, the Cancel key is depressed (YES in ST54), and the sequence of FIG. 3 ends.

Figure 4:
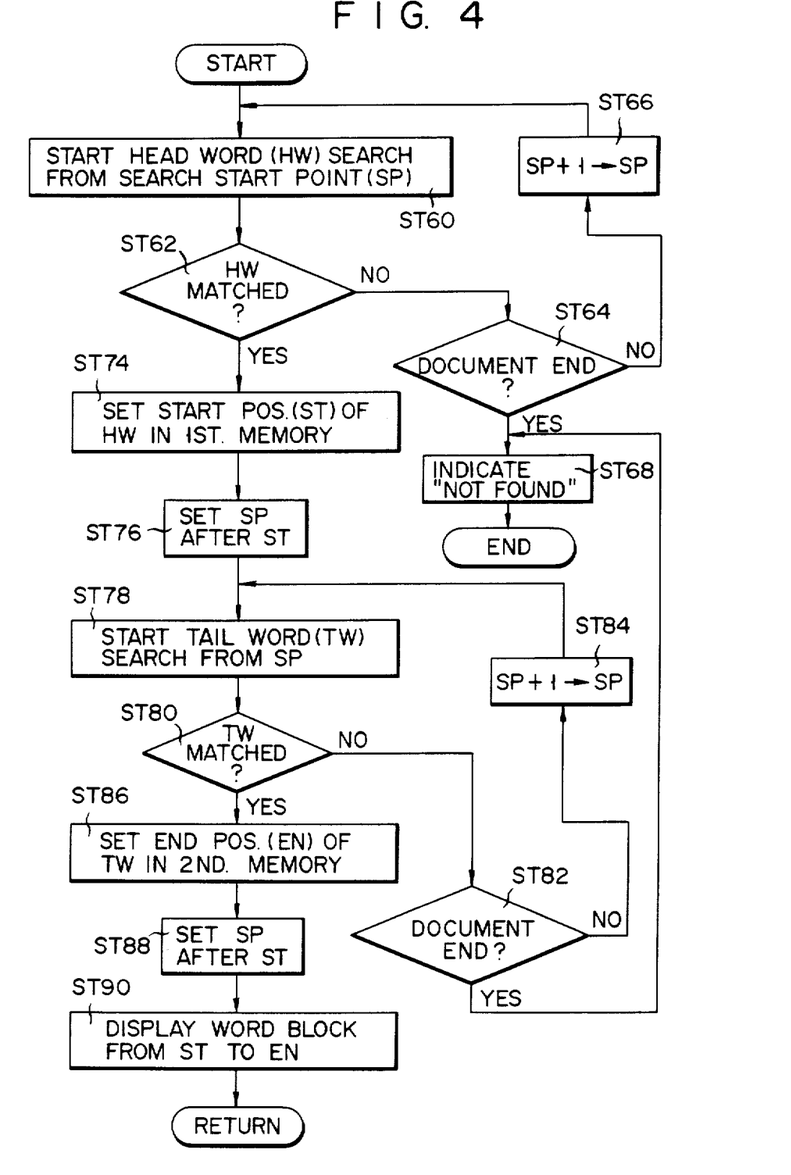
FIG. 4 is a flow chart of a subroutine used in the searching method of FIG. 3.

FIG. 4 is a flow chart of a subroutine (ST34) used in the searching method of FIG. 3.

When storage of the head word "JW-6", the tail word "English language" and cursor position CP as the search start position is completed, searching for a match to the word block defined between "JW-6" and "English language" is started from the position CP (start in FIG. 4). That is, search of head word "JW-6" is started from search start point SP (=CP) (ST60). The data of head word "JW-6" is compared with the data of a given word(s) or symbol(s) following the search start point SP. Here, the number of the given word(s) is selected to be the same as that of the head word to be searched. When no word(s) or symbol(s) matched with head word "JW-6" is found (NO in ST62), but the document end is not reached (NO in ST64), search start point SP is incremented by one (ST66). Then, similar searching for a match to head word "JW-6" is started from updated search start point SP (ST60). When head word "JW-6" is not found after searching up to the document end (YES in ST64), an operator message "NOT FOUND" is displayed (ST68) and the program sequence shown in FIGS. 3 and 4 is completed (end).

When head word "JW-6" is found upon searching (YES in ST62, HW1 in FIG. 5), the head position ST (position of "J") of the head word HW1 in document memory 13 is set in (added to) first memory 16 (ST74), and search start point SP is shifted to position SP1 (position of "i") following the head word HW1 (ST76).

Subsequently, searching for a match to the tail word "English language" is started from search start point SP=SP1 (ST78). When no word(s) or symbol(s) matched with tail word "English language" is found (NO in ST80), but the document end is not reached (NO in ST82), the search start point is incremented by one (ST84). Then, similar searching for a match to tail word "English language" is restarted from updated point SP (ST78). If the tail word "English language" is not found upon searching through the document end (YES in ST82), an operator message "NOT FOUND" is displayed (ST68) and the program sequence shown in FIGS. 3 and 4 is completed (end).

In this manner, first tail word TW1 in FIG. 5 is found upon repeating steps ST78 to ST84. (Second tail word TW2 is not searched). When the tail word "English language" is found upon searching (YES in ST80, TW1 in FIG. 5), end position EN (position of "e") of tail word TW1 in document memory 13 is set in second memory 17 (ST86), and search start point SP is shifted to position SP1 next to start position ST of head word HW1 (ST88).

Upon completing the above operation, end position EN of tail word TW1 in document memory 13 and start position ST of head word HW1 in document memory 13 are sent to CPU 6 in FIG. 1. Based on position data ST and EN, CPU 6 reads out the sentence defined between head word HW1 and tail word TW1 from document memory 13, and displays it (ST90). When predetermined searching is completed in this manner, the program sequence returns to step ST36 in FIG. 3. Since, however, the sentence between HW1 and TW1 is not the object word block X, the next search key is depressed by the operator (YES in ST36) so that the subroutine of FIG. 4 is again executed from the present search start point SP (=SP1). Then, word block X defined between HW2 and TW1 is found and displayed (ST90). Thereafter, the program sequence returns to step ST36 in FIG. 3. (Third head word HW3 is not searched.)

Figure 6:
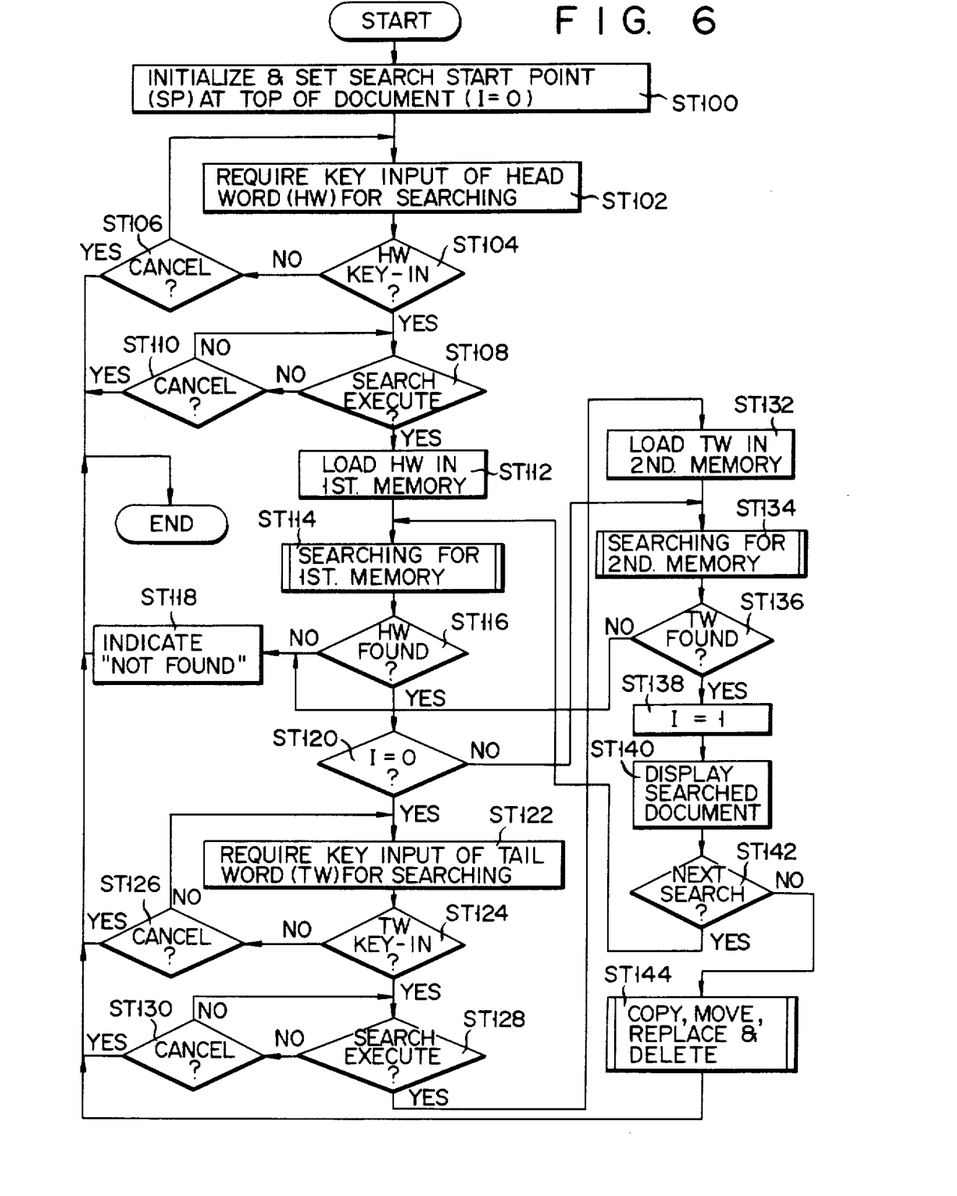
FIG. 6 is a flow chart showing the basic sequence of the searching method according to another embodiment of the present invention.
Figure 7A:
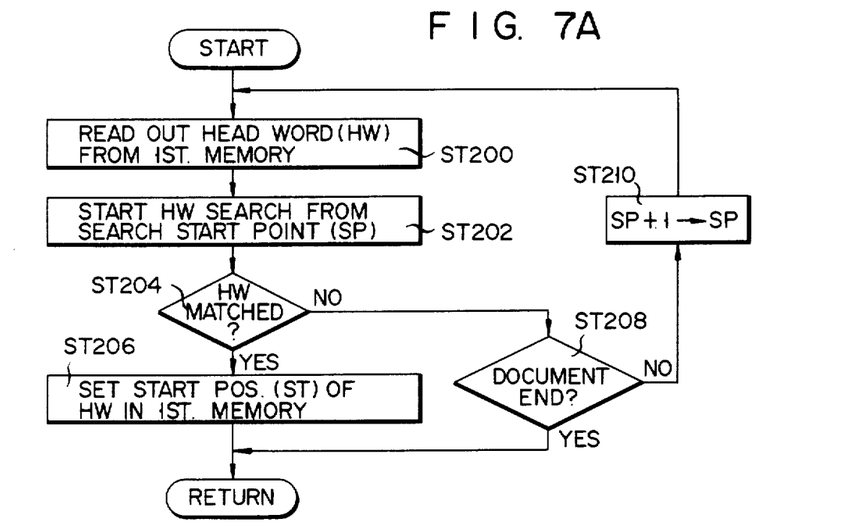
FIGS. 7A and 7B are flow charts of a subroutine used in the method of FIG. 6.
Figure 7B:
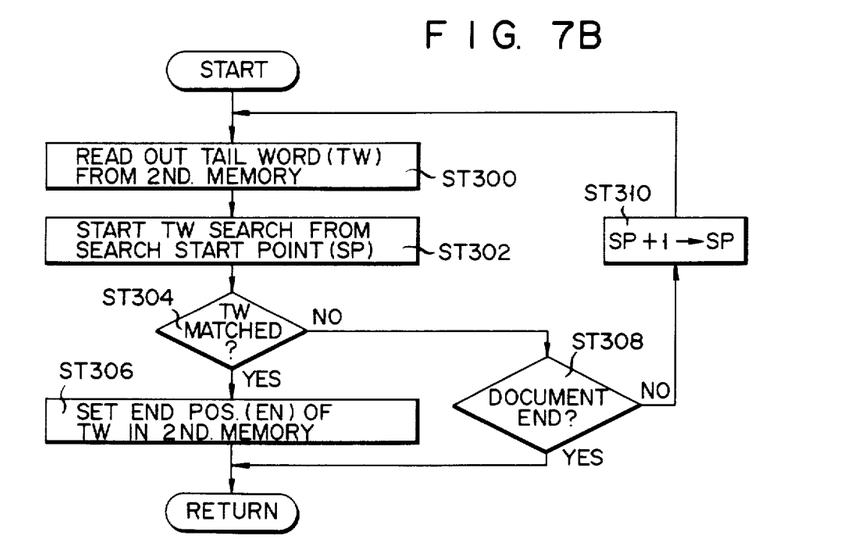

FIG. 6 is a flow chart showing the basic sequence of the searching method according to another embodiment of the present invention. FIGS. 7A and 7B are flow charts of a subroutine (ST114, ST134) used in the method shown in FIG. 6.

The operator of the wordprocessor first depresses the Search Designate/Execute key of keyboard 1 (start of the flow in FIG. 6). Then, hardware including CPU 6 is initialized, search start point SP is set at the document head position, and initial flag bit I (not shown) is set at 0 (ST100). Key input of the head word HW to be searched is requested (instruction requesting this is displayed on the screen of the wordprocessor) (ST102). If the head word is not keyed in (NO in ST104) and the Cancel key is depressed (YES in ST106), the search function is cancelled (end of the flow in FIG. 6). However, if the Cancel key is not depressed (NO in ST106), the execution of the sequence of the search program is interrupted until head word HW is keyed in by the operator.

When the head word is keyed in (YES in ST104), it is checked if searching is to be performed. When the Search Designate/Execute key is not depressed (NO in ST108) and the Cancel key is depressed (YES in ST110), the search function is cancelled (end). When the Cancel key is not depressed (NO in ST110), execution of the sequence of the search program is interrupted until the Search Designate/Execute key is depressed.

When the Search Designate/Execute key is depressed (YES in ST108), input head word HW is loaded in first memory 16 (ST112), and searching for a match to head word HW is started from the document head position of the search start page (ST114).

FIG. 7A is a flow chart of subroutine step ST114 used in the method shown in FIG. 6. Head word HW is first read out from first memory 16 (ST200). Searching for a match to head word HW is started from search start point SP (ST202). When no word(s) or symbol(s) matched with head word HW is found (NO in ST204), but the document end is not reached (NO in ST208), search start point SP is incremented by one (ST210). Then, searching of head word HW is started from updated point SP (ST200). When the head word is not found upon searching to the document end (YES in ST208), the sequence returns to the flow in FIG. 6. When head word HW is found (YES in ST204), start position ST of found head word HW in document memory 13 is set in first memory 16 (ST206) and the sequence returns to the flow of FIG. 6.

If the head word is not found upon searching to the document end in the flow of FIG. 7A (NO in ST116), an operator message "NOT FOUND" is displayed (ST118) and the program sequence in FIG. 6 is completed (end).

When head word HW is found in the flow of FIG. 7A (YES in ST116), the content of initial flag bit I is checked (ST120). Since I=0 in previous step ST100 (meaning that the tail word has not been found) (YES in ST120), searching for a match to tail word TW is begun.

Key input of tail word TW is requested (instruction requesting this is displayed on the screen of the wordprocessor) (ST122). If the tail word is not keyed in (NO in ST124) and the Cancel key is depressed (YES in ST126), the search function is cancelled (end of the flow in FIG. 6). If the Cancel key is not depressed (NO in ST126), execution of the sequence of the search program is interrupted until tail word TW is keyed in by the operator.

When the tail word is keyed in (YES in ST124), it is checked if searching is to be performed. If the Search Designate/Execute key is not depressed (NO in ST128) and the Cancel key is depressed (YES in ST130), the search function is cancelled (end). However, if the Cancel key is not depressed (NO in ST130), execution of the sequence of the search program is interrupted until the Search Designate/Execute key is depressed by the operator.

When the Search Designate/Execute key is depressed (YES in ST128), input tail word TW is loaded in second memory 17 (ST132), and searching for a match to input tail word TW is started from the start position of the search start page (ST134).

FIG. 7B is a flow chart of subroutine step ST134 in the method in FIG. 6. Tail word TW is read out from second memory 17 (ST300). Searching for a match to tail word TW is started from search start point ST determined in step ST100 (ST302). If no word(s) or symbol(s) matched with tail word TW is found (NO in ST304), but the document end is not reached (NO in ST308), search start point SP is incremented by one (ST310). Then, searching for a match to tail word TW is started from updated point SP (ST300). If the tail word is not found upon searching through the document end (YES in ST308), the sequence returns to the flow in FIG. 6. When tail word TW is found (YES in ST304), end position EN of found tail word TW in document memory 13 is set in second memory 17 (ST306), and the sequence returns to the flow of FIG. 6.

If the tail word is not found upon searching to the document end in the flow of FIG. 7B (NO in ST136), an operator message "NOT FOUND" is displayed (ST118) and the program sequence shown in FIG. 6 is completed (end).

When tail word TW is found upon execution of the flow of FIG. 7B (YES in ST136), the content of initial flag bit I is changed to "1" (ST138). Based on start position ST of the head word determined in step ST206 and on end position EN of the tail word determined in step ST306, a sentence defined between head word HW and tail word TW is read out from document memory 13 and is displayed (ST140). If the displayed sentence is not the one desired (e.g. from HW1 to TW1 in FIG. 5), the Next Search key of keyboard 1 is depressed (YES in ST142). Then, steps ST114 to ST140 are executed again. The Next Search key is repeatedly depressed until the desired word block X is found and displayed on the screen of the wordprocessor.

When word block X (the sentence indicated by the dotted line in FIG. 5) is displayed on the screen (NO in ST142), any desired operation such as copy can be performed (ST144). Step ST144 may be the same as steps ST38 to ST54 in FIG. 3. When step ST144 ends, the program sequence shown in FIG. 6 ends.

According to the embodiment shown in FIGS. 3 and 4, without performing inconvenient cursor movement or scroll operation, a long sentence portion or bulky word block can be searched by three steps of simple key input operations for head word HW, intermediate symbol IS and tail word TW. In the embodiment shown in FIGS. 6, 7A and 7B, without performing inconvenient cursor movement or scroll operation, a long sentence or bulky word block can be searched for two simple key inputs of head word HW and tail word TW. Therefore, if a specific word block to be searched for is long or bulky, the work load of the operator is decreased considerably.

In either embodiment of the present invention described above, if there are more than one word blocks which are defined between head word HW and tail word TW, the next word block can be found by depressing the Next Search key or Search Designate/Execute key several times.

Steps ST38 to St54 in FIG. 3 and step ST144 in FIG. 6 can include extraction/movement/replacement processing of sentence data supplied from an external memory device (not shown).

The present invention is similarly applicable to methods other than the embodiments described above within the scope of the present invention. For example, the method of the present invention may be applied to conventional hardware (personal computers or wordprocessors). In this case, a software package such as a floppy disk in which software, i.e., the flow chart of the present invention is written can be prepared for conventional hardware. Further, if head word HW is the start position of a sentence to be searched for and tail word TW is a period or its equivalent symbol, searching can be performed in units of sentences. If the number of words from head word HW is designated after keying in head word HW, searching can be performed in units of the designated words.

What is claimed is:

1. A method of searching for a prescribed word block having a head portion at its beginning and a tail portion at its end, said head portion and said tail portion constituting less than the entirety of said word block, said searching being performed within a document that is stored in a memory of word processing equipment, comprising the steps of:
    inputting to the word processing equipment a leading word which serves to define a head portion of a word block desired to be located;
    inputting to the word processing equipment a trailing word which serves to define a tail portion of the word block desired to be located; and
    searching the document for a word block with a head portion that corresponds to said leading word, and a tail portion that corresponds to said trailing word.

2. A method according to claim 1, further comprising the steps of:
    inputting to the word processing equipment an intermediate symbol after inputting said leading word and before inputting said tailing word, said intermediate symbol defining an end of entry of said leading word and a beginning of entry of said trailing word.

3. A method according to claim 1, comprising the further steps of:
    displaying said word block obtained in the word block searching step;
    repeating said word block searching step to find all word blocks having said corresponding head portion and said corresponding trailing portion within a portion of said document; and
    displaying each of said word blocks.

4. A method according to claim 2, comprising the further steps of:
    displaying said word block obtained in the word block searching step;
    repeating said word block searching step to find all word blocks having said corresponding head portion and said corresponding trailing portion within a portion of said document; and
    displaying each of said word blocks so that the user can choose one of said word blocks.

5. A method for searching for a prescribed word block having a head portion at its beginning and a tail portion at its end, said head portion and said tail portion constituting less than the entirety of said word block, said searching being performed within a document that is stored in a memory of word processing equipment, comprising the steps of:
    inputting to the word processing equipment a leading word which serves to define a head portion of a word block desired to be located;
    searching the document for a first word corresponding to said leading word;
    inputting to the word processing equipment a trailing word which serves to define a tail portion of the word block desired to be located;
    searching the document for a second word corresponding to said trailing word; and
    displaying a word block that is defined between said first word corresponding to said leading word, and said second word corresponding to said trailing word.

6. A method according to claim 5, further comprising the steps of:
    repeating said leading word searching step and said trailing word searching step to define a plurality of word blocks having said corresponding head portion and said corresponding trailing portion; and
    displaying each of said plurality of word blocks.

7. A word block searcher for word processing equipment, which searches for a word block having a head portion at its beginning and a tail portion at its end, said head portion and said tail portion constituting less than the entirety of said word block, said searcher comprising:
    means for inputting to the word processing equipment a leading word which serves to define a head portion of a word block desired to be searched and a trailing word which serves to define a tail portion of said word block to be searched; and
    means for searching a document for a word block whose head portion corresponds to said leading word, and whose tail portion corresponds to said trailing word.

8. A word block searcher according to claim 7, wherein:
    said inputting means also performs a function of inputting to the word processing equipment an intermediate symbol defining an end of entry of said leading word and a beginning of entry of said trailing word.

9. A word block searcher according to claim 7, further comprising:

means for displaying said word block found by said searching means.

10. A word block searcher according to claim 8, further comprising:
means for displaying said word block found by said searching means.

11. A word block searcher according to claim 9, wherein said searching means is provided with:
means for repeating said word block searching to find other word blocks having said corresponding head portion and said corresponding trailing portion, said displaying means displaying each of said found word blocks.

12. A word block searcher according to claim 10, wherein said searching means is provided with:
means for repeating said word block searching to find a plurality of word blocks having said corresponding head portion and said corresponding trailing portion, said displaying means displaying each of said found word blocks.

13. A word block searcher according to claim wherein said searching means includes:
first memory means for storing said head portion; and
second memory means for storing said tail portion.

14. A word block searcher according to claim 13, wherein said searching means further includes:
third memory means for storing a start point data which defines the starting point of said word block searching.

15. A word block searcher according to claim 14, wherein said searching means further includes:
document memory means for storing data of said word block.

16. A software package provided with the method of claim 1.

17. A software package provided with the method of claim 2.

18. A software package provided with the method of claim 3.

19. A software package provided with the method of claim 4.

20. A software package provided with the method of claim 5.

21. A software package provided with the method of claim 6.

22. A word processing equipment comprising:
storing means for storing a document data drafted by a user using the word processing equipment;
inputting means for inputting to the word processing equipment a leading word and a trailing word; and
processing means for searching the document for a word block having a head portion at its beginning which corresponds to said leading word and having a tail portion at its end which corresponds to said trailing word, said head portion and said tail portion constituting less than the entirety of said word block.

23. A word processing equipment according to claim 22, further comprising:
means for displaying said word block searched by said processing means.

24. A word processing equipment according to claim 22, wherein said processing means continually repeats the searching for another word block whose head portion corresponds to said trailing word, said searching repeated until a prescribed word block is found.

25. A word processing equipment according to claim 24, further comprising:
means for displaying each of said word blocks searched by said processing means.

26. A word processing equipment according to claim 22, further comprising:
another memory means for storing said leading word and said trailing word input by said inputting means, and wherein said processing means reads said leading word and trailing word from said another memory means for searching said prescribed word block.

27. A word processing equipment according to claim 26, wherein said another memory means stores a start point data which defines a starting point from which said processing means starts to search for said prescribed word block.

28. A method according to claim 1, further comprising the steps of:
repeating said searching step for another word block whose head portion corresponds to said leading word and whose tail portion corresponds to said trailing word; and
continually executing said repeating step until a prescribed word block is found.

* * * * *